United States Patent [19]
Galazin et al.

[11] Patent Number: 5,375,819
[45] Date of Patent: Dec. 27, 1994

[54] DUAL IN-LINE HEIGHT CONTROL VALVE ASSEMBLY

[75] Inventors: Gregory T. Galazin, Montague; William C. Pierce, Muskegon, both of Mich.

[73] Assignee: Nai Neway, Inc., Muskegon, Mich.

[21] Appl. No.: 974,064

[22] Filed: Nov. 10, 1992

[51] Int. Cl.⁵ .......................... B60G 11/27; F16F 9/43
[52] U.S. Cl. ............................. 267/64.16; 137/627.5; 137/636.1; 267/64.28; 280/714
[58] Field of Search ................ 267/64.16, 64.28, 131; 280/714; 137/627.5, 636.1, 596.2

[56] References Cited

U.S. PATENT DOCUMENTS

| | | | |
|---|---|---|---|
| 2,905,462 | 9/1959 | Christensen | 267/64.16 |
| 2,976,053 | 3/1961 | Pribonic et al. | 251/234 |
| 3,036,596 | 5/1962 | Alfieri | 137/636.1 |
| 3,044,495 | 7/1962 | Alfieri | 137/627.5 X |
| 3,284,142 | 11/1966 | Bueler | 137/627.5 X |
| 3,563,270 | 2/1971 | Denny | 137/625.21 |
| 3,858,903 | 1/1975 | Henry et al. | 280/711 |
| 3,884,454 | 5/1975 | Passmore | 267/64.16 |
| 4,726,571 | 2/1988 | Smith et al. | 267/64.16 |
| 5,161,579 | 11/1992 | Anderson, Jr. | 280/714 X |
| 5,161,817 | 11/1992 | Daum et al. | 267/64.16 X |

FOREIGN PATENT DOCUMENTS

| | | | |
|---|---|---|---|
| 190810 | 9/1955 | Austria | 137/627.5 |
| 807196 | 10/1936 | France | 137/627.5 |
| 1197724 | 6/1959 | France | 137/627.5 |
| 1242067 | 6/1967 | Germany | 137/627.5 |
| 368205 | 3/1963 | Switzerland | 137/627.5 |
| 845568 | 8/1960 | United Kingdom | 267/64.16 |
| 1559681 | 1/1980 | United Kingdom | 280/714 |
| 1548088 | 3/1990 | U.S.S.R. | 280/714 |

Primary Examiner—Robert J. Oberleitner
Assistant Examiner—Alfred Muratori
Attorney, Agent, or Firm—Varnum, Riddering, Schmidt & Howlett

[57] ABSTRACT

A valve assembly for controlling the delivery and exhaustion of pressurized air to and from an air spring. The valve assembly comprises a body having a valve bore with a coaxially open end, and a port in communication with the valve bore. The port is adapted to receive an air connection with an air spring. An actuator shaft, having a first end and a second end, is disposed coaxially in the valve bore for reciprocal movement between an actuating position and a rest position, and is biased toward the rest position. A valve block fixes within the valve bore and has an internal end and an external end. A coaxial bore extends from the internal end to the external end and slidably receives the actuator shaft second end. A stop chamber is disposed between the external end and the internal end. The valve block has a seat on the external end at the coaxial bore. An air passage communicates with the port and the coaxial bore. A stop member mounts on the actuator shaft within the stop chamber so that the actuator shaft second end will be spaced within the coaxial bore inwardly from the seat when the actuator shaft is in the rest position. Movement of the actuator shaft relative to the valve body is limited to the distance the stop moves within the stop chamber.

17 Claims, 4 Drawing Sheets

FIG. 2

DUAL IN-LINE HEIGHT CONTROL VALVE ASSEMBLY

BACKGROUND OF THE INVENTION

1. Field of the Invention

The invention relates to control valves, and more particularly to control valve assemblies having separate intake and exhaust valves controlled by a cam.

2. State of the Prior Art

Air suspension systems have become increasingly popular for use in vehicle suspensions, seats, and cabs on semi-trailer truck rigs and other vehicles. Each requires a height control valve which maintains the design height of the suspension. In a semi-trailer suspension the design height is the spacing between the frame and the axle. The height control valve senses when the spacing is greater or less than its design value, and accordingly adjusts the pressure in the air springs disposed between the frame and axle. The air suspension system with a height control valve maintains a uniform height of the air spring over a range of vehicle loading conditions.

Some height control valves immediately respond to changes in vehicle height as the vehicle moves. But other height control valves are designed not to respond to momentary changes in the design height. A time delay mechanism in the valve delays actuation of the valve for a specified time after the valve senses a change in height, preventing the valve from reacting to temporary height changes. A dead band in the height sensing portion of the valve prevents the valve from attempting to correct every minute change in height.

Previous height control valves employed somewhat complicated and bulky time delay and dead band mechanisms. For instance, U.S. Pat. No. 3,884,454 issued May 20, 1975 to Passmore discloses a height control valve having an attached vane damper in which a vane rotates in a fluid filled damping chamber in response to height changes. A filling or exhaust valve is actuated to adjust the air spring only after the vane has rotated a specified amount. As the vane rotates away from its rest position, incompressible damping fluid must pass through the small space between the end of the vane and the chamber wall, slowing the motion of the vane. As the vane returns to its center a check valve opens to allow the fluid to quickly flow through a bypass channel. The vane thus causes the valve to open slowly, yet close quickly. The vane damper works well but is bulky and somewhat complicated. Also, the vane damper is not an integral part of the valve actuator, adding to the overall bulk and complexity of the valve.

Other height control valves employ a double ended piston, slidably mounted on an actuator rod, and adapted for reciprocal movement within a double ended fluid filled damping chamber in response to rotational movement of a height sensing arm. As one end of the piston enters an end of the chamber from the piston's at rest position, the fluid is forced past the piston retarding the piston's movement. Flapper valves on the piston allow it to exit the end of the chamber and return to its rest position quickly. The forward portion of each end of the piston has a large clearance so that as the piston returns to the central at rest position, and an end of the piston starts to enter an end of the chamber, there is a sufficient gap to allow fluid to freely flow past the piston and quickly return to center. Only as the piston moves from the center position is its movement retarded.

The piston must move a specified distance along the actuator rod before it engages a projection thereon and actuates the air valve. Movement of the actuator rod in one direction allows air to fill the air spring, and movement of the actuator rod in the opposite direction allows air to exhaust from the air spring. The piston has many surfaces with close tolerances making manufacturing more difficult.

SUMMARY OF THE INVENTION

The present invention provides a compact valve assembly well suited to applications where space is critical, such as an air suspension for a driver's seat. It contains relatively few parts enhancing its reliability and reducing manufacturing complexity and expense.

A valve assembly according to the invention controls the delivery and exhaustion of pressurized air to and from an air spring. The valve assembly comprises a body having a valve bore with a coaxially open end, a control bore therein transverse to and intersecting the valve bore, and a port in communication with the valve bore. The port is adapted to receive an air connection with an air spring. An actuator shaft, having a first end and a second end, is disposed coaxially in the valve bore for reciprocal movement between an actuating position and a rest position, and is biased toward the rest position. A control member mounts rotatably within the control bore and operably connects to the actuator shaft first end. Rotation of the control member will urge the actuator shaft to and from the actuating position. A piston mounts on the actuator shaft intermediate the first and second ends. A valve block is fixed within the valve bore and has a coaxial bore which slidably receives the actuator shaft second end. A seat is provided on one end of the valve block at the coaxial bore. An air passage in the valve block communicates with the port and the coaxial bore. A stop member mounts on the actuator shaft in a position where the actuator shaft second end will be spaced within the coaxial bore inwardly from the seat when the actuator shaft is in the rest position. An incompressible fluid fills the valve bore between the valve block and the actuator shaft first end. A check valve on the piston enhances the flow of fluid from a first side of the piston to a second side of the piston as the actuator shaft moves away from the actuating position and restricts flow of fluid from the second side of the piston to the first side of the piston as the actuator shaft moves toward the actuating position. A valve seal is biased against the seat. Upon rotation of the control member, the actuator shaft is urged toward the actuating position, which is reached only after the second end has engaged the valve seal and urged it away from the seat, thereby establishing communication between the open end and the port.

Preferably, a cup is disposed coaxially within the valve bore internally of the actuator shaft first end and in engagement with the first end. The cup is biased outwardly against the bias of the actuator shaft and the control member has a cam portion engaging the cup, whereby the movement of the cup against the actuator shaft is inhibited by the control member when the actuator shaft is in the rest position and permitted when the control member is rotated.

The outside surface of the cup is preferably fluted; the flutes passing the incompressible fluid so that movement of the cup is relatively unimpeded by the fluid.

Also, a central axis of the actuator shaft preferably aligns with a central axis of the cup.

The valve block can have an internal end and an external end, with the seat disposed on the external end, and a stop chamber between the internal end and the external end. The stop is disposed on the actuator shaft within the stop chamber.

The second end is preferably spaced from the seat greater than 0.010 inches when the actuator shaft is in the rest position, thereby contributing to a time delay between rotation of the control member and actuation by the actuator shaft.

The piston preferably has at least one aperture extending therethrough, and the check valve comprises a flexible plate disposed on one side of the piston in a position to cover the aperture.

A further valve assembly according to the invention controls the delivery and exhaustion of pressurized air to and from an air spring. The valve assembly comprises a body having two parallel valve bores, each with a coaxially open end. A control bore in the body is normal to an imaginary plane containing both valve bores and intersects the valve bores. An external port communicates with one of the valve bores, and is adapted to receive an air connection with an air spring. An air passage extends between and communicates with both valve bores. Each valve bore has an actuator shaft disposed coaxially therein for reciprocal movement between an actuating position and a rest position. The actuator shaft is biased toward the rest position and has a first end and a second end. A control member rotatably mounts within the control bore and operably connects to each actuator shaft first end. Rotation of the control member in one direction urges one actuator shaft to the actuating position and leaves the other actuator shaft in the rest position. Rotation of the control member in the opposite direction urges the other actuator shaft toward the actuating position and leaves the one actuator shaft in the rest position. A piston mounts on said actuator shaft intermediate the first and second ends. A valve block fixes within each valve bore and has a coaxial bore which slidably receives the respective actuator shaft second end. A seat is located on one end of the valve block. An air passage in the valve block communicates between the coaxial bore and the port. A stop member mounts on each actuator shaft in a position where the actuator shaft second end will be spaced within the coaxial bore inwardly from the seat when the actuator shaft is in the rest position. An incompressible fluid fills each valve bore between the valve block and the actuator shaft first end. A check valve on each piston enhances the flow of fluid from a first side of the piston to a second side of the piston as the actuator shaft moves away from the actuating position, and restricts flow of fluid from the second side of the piston to the first side of the piston as the actuator shaft moves toward the actuating position. A valve seal is biased against the seat. A first valve bore end communicates with atmosphere, and a second valve bore end communicates with a pressurized air source. Upon rotation of the control member in one direction, the port will be in communication with atmosphere, and upon rotation of the control member in the opposite direction, the port will be in communication with the pressurized air source.

A further valve assembly according to the invention controls the delivery and exhaustion of pressurized air to and from an air spring. The valve assembly comprises a body having a valve bore with a coaxially open end, and a port in communication with the valve bore. The port is adapted to receive an air connection with an air spring. An actuator shaft, having a first end and a second end, is disposed coaxially in the valve bore for reciprocal movement between an actuating position and a rest position, and is biased toward the rest position. A valve block fixes within the valve bore and has an internal end and an external end. A coaxial bore extends from the internal end to the external end and slidably receives the actuator shaft second end. A stop chamber is disposed between the external end and the internal end. The valve block has a seat on the external end at the coaxial bore. An air passage communicates with the port and the coaxial bore. A stop member mounts on the actuator shaft within the stop chamber so that the actuator shaft second end will be spaced within the coaxial bore inwardly from the seat when the actuator shaft is in the rest position. Movement of the actuator shaft relative to the valve body is limited to the distance the stop moves within the stop chamber.

The valve assembly is suitable for use in a system for controlling the height of a vehicle, comprising a pressurized air source, an air spring, and means to control the flow of air between the pressurized air source and the air spring.

BRIEF DESCRIPTION OF THE DRAWINGS

The invention will now be described with reference to the accompanying drawings in which.

DETAILED DESCRIPTION OF THE DRAWINGS

Figure 1:
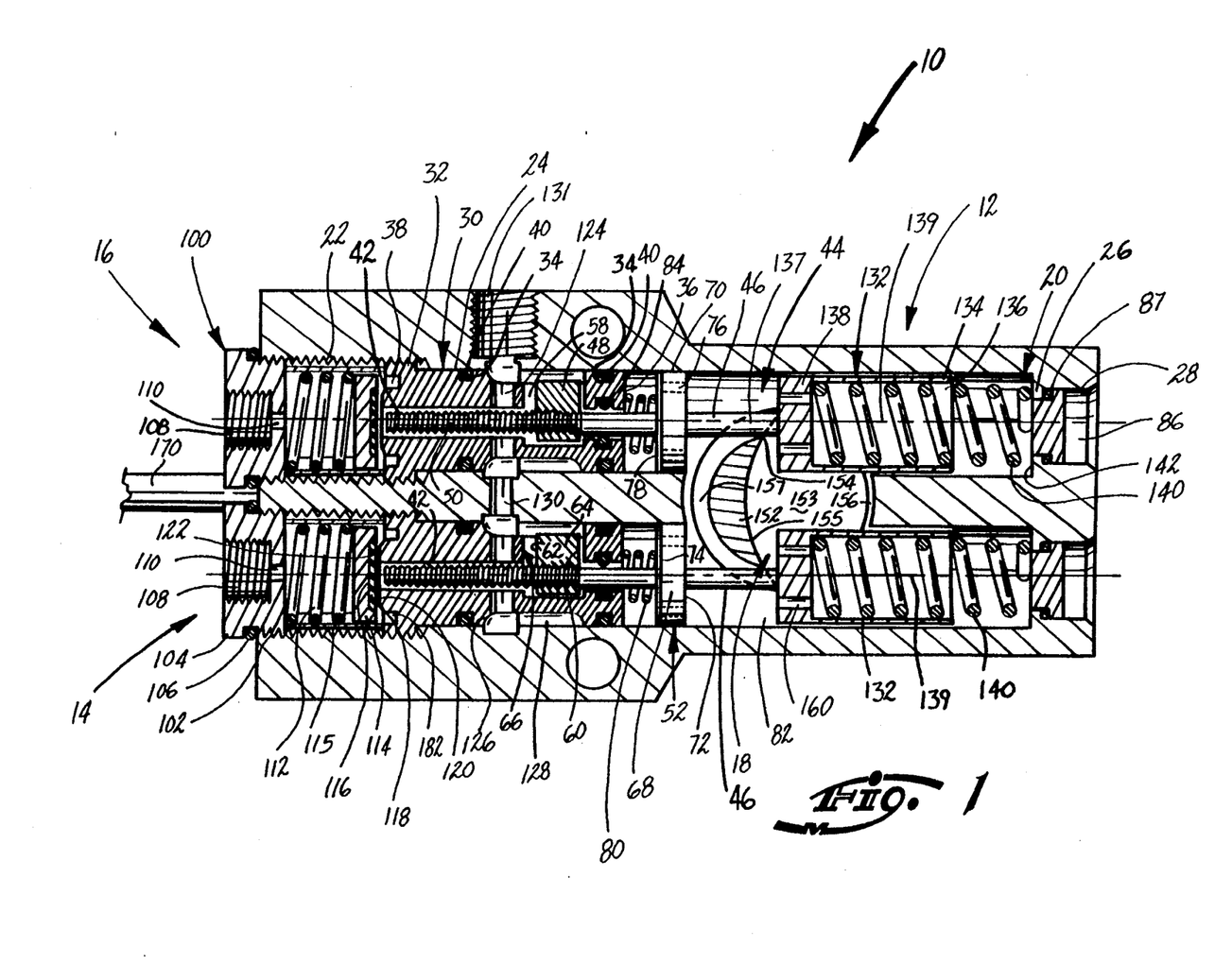
FIG. 1 is a sectional side elevation of a valve assembly according to the invention.

Referring to the drawings, and to FIG. 1 in particular, a height control valve assembly 10 according to the invention comprises generally a valve body 12 having a intake valve 14, an exhaust valve 16 and a control cam 18 which controls the operation of the intake and control valves 14 and 16. The intake valve 14 and exhaust valve 16 operate similarly. Therefor, the construction and operation of the intake valve 14 will be described first, and will apply to the construction and operation of the exhaust valve 16.

The intake valve 14 comprises a round bore 20 into the valve body 12, a threaded section 22 at its entrance (to the left as shown in FIG. 1), and a slightly narrower diameter non-threaded central section 24. Towards the opposite end of the body 12, the bore 20 reduces in diameter to approximately half the diameter of the central section 24, to form a neck 26, and expands to form an exit bore 28 of an intermediate diameter between the diameter of the central section 24 and neck 26.

The bore 20 coaxially receives a valve block 30, having threads 32 on its outer surface which engage the threaded section 22 of the bore 20, to firmly lock the block 30 within the bore 20. The valve block 30 is cylindrical and adapted to be received within the central section 24 of the bore 20 with close tolerances. A pair of annular grooves 34 traverse the circumference of the valve block 30, one near its internal end 36, and one towards its external end 38, yet internal to the threads 32. Each of the annular grooves 34 receives a circular gasket 40 which seals the valve block 30 to the bore 20.

A central valve block bore 42 extends from the valve block external end 38 to the valve block internal end 36, and receives a shaft 46 of a valve actuator 44. The valve actuator 44 also comprises a threaded stop 48 threaded onto a threaded section 50 of the actuator shaft 46, and a check valve 52 mounted on the actuator shaft 46.

Figure 3:
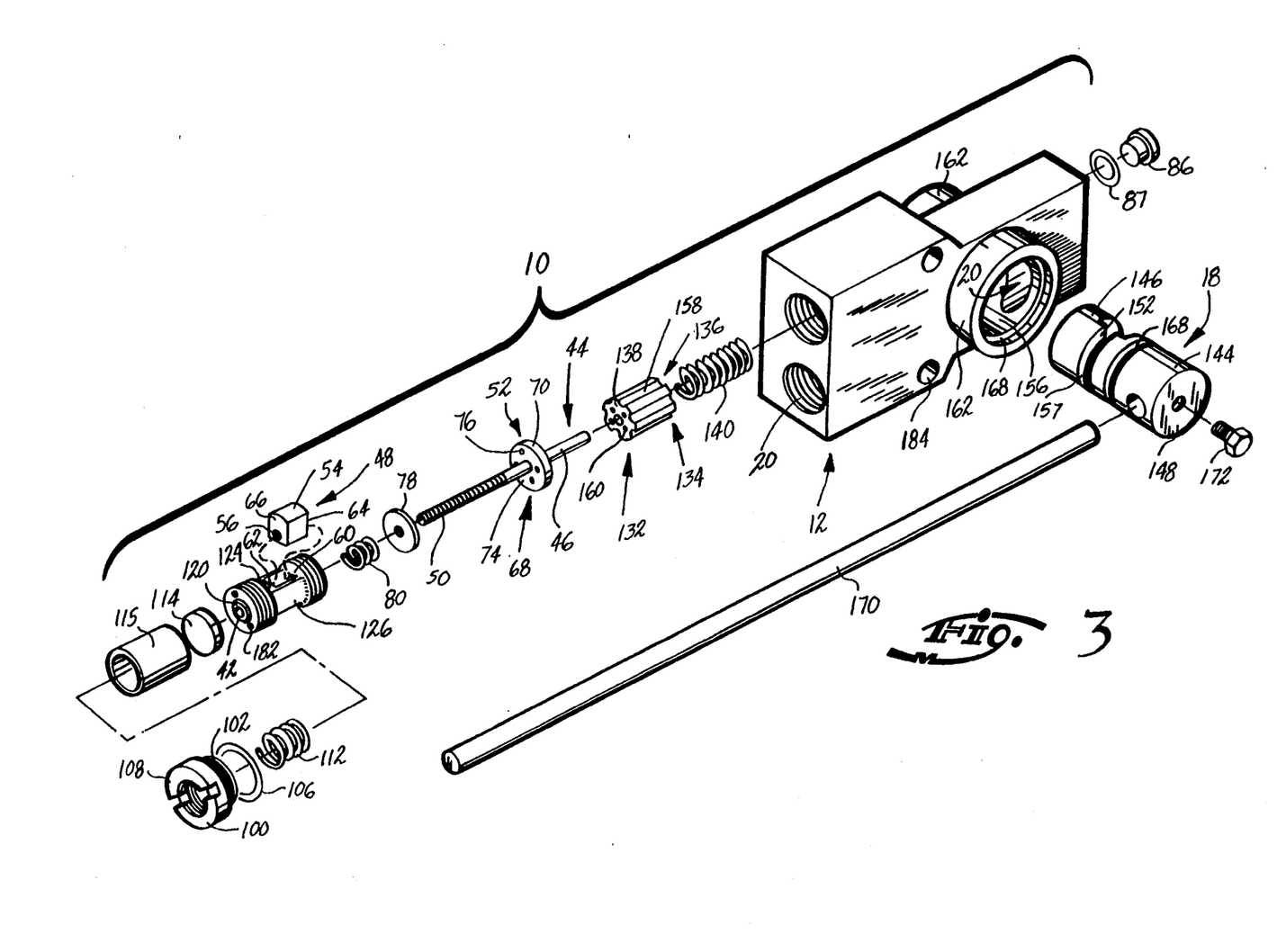
FIG. 3 is an exploded perspective view of the valve assembly of FIG. 1.

The stop 48 threads onto the valve actuator shaft threads 50 from the external end of the valve actuator shaft 46. The stop 48 is rectangular in cross-section, with one end 54 of the rectangle curved to adapt to the inside curvature of the central section 24 of the bore 20, and has a threaded aperture 56 disposed towards the opposite end of the rectangle. (See FIG. 3.) The stop 48 threads onto the actuator shaft 46 by means of the threaded aperture 56, and is received within a stop chamber 58 extending radially into the valve block 30.

The stop 48 and stop chamber 58 limit travel of the actuator shaft 46, and properly position it when at rest. The space between an internal wall 60 and an external wall 62 defines the width of the stop chamber 58, which exceeds the width of the stop block 48 defined by the distance between its internal face 64 and external face 66. The stop 48 is positioned on the valve actuator shaft 46 so that the external end of the valve actuator shaft 46 extends to within 0.014 inches of the entrance to the bore 20. The width of the stop chamber 58 exceeds the width of the stop 48 by 0.06 inches, thus restricting lateral movement of the valve actuator shaft 46 within the bore 20 to 0.06 inches. These tolerances reduce sensitivity and provide a dead band as will be more fully explained hereinafter.

The check valve 52 comprises a check valve disk 68 mounted on the valve actuator shaft 46 internal to the valve block 30. The flat circular check valve disk 68 comprises a radial outer edge 70, an internal face 72 and an external face 74. Four apertures 76, located midway between the outer radial edge 70 and the center of the disk 68, penetrate the disk 68 at locations spaced 90 degrees apart about the disk 68. A thin plastic diaphragm 78 operates against the external face 74 of the check valve disk 68 and extends from the valve actuator shaft 46 radially outwardly past the check valve disk hole 76. A coil spring 80 coaxially receives the valve actuator shaft 46 through its coils and operates between the valve block 30 and the external face 74 of the check valve disk 68, to bias the valve actuator shaft 46 away from the valve block 30, and inwardly of the bore 20.

The check valve 52 acts as a one way damper, restricting movement of the actuator shaft 46 outwardly of the bore 20, while freely allowing movement of the actuator shaft 46 inwardly of the bore 20. A silicone based incompressible damping fluid 82 fills the bore 20 internal of the valve block 30, and restricts movement of the valve actuator shaft 46 outwardly of the bore 20. The check valve disk 68 compresses the damping fluid 82 between its external face 74 and the valve block 30. The diaphragm 78 acting against the external face 74 of the check valve disk 68 prevents damping fluid 82 from passing through the check valve disk holes 76 as the check valve disk 68 moves outwardly of the bore 20. Movement of the check valve disk 68 outwardly of the bore 20 thus requires damping fluid 82 to pass through the narrow space between the check valve disk outer radial edge 70 and the wall of the central section 24 of the bore 20, which preferably has a clearance of 0.003 inches. The check valve disk 68 thus acts as a natural damper restricting and slowing the movement of the valve actuator shaft 46 outwardly of the bore 20.

However, the diaphragm 78 does not block passage of damping fluid 82 through the disk holes 76 as the check valve disk 68 moves inwardly of the bore 20. Thus, the check valve 52 provides little damping action in this direction, allowing the valve actuator shaft 46 to move inwardly of the bore 20 with little restriction by the damping fluid 82. The one way damping action of the check valve 52 reduces the sensitivity of the height control valve assembly 10 as will be more fully explained hereinafter.

The damping fluid 82 is prevented from passing past the valve block 30 by the gasket 40. A shaft packing 84 seals the valve actuator shaft 46 as it passes through the valve block bore 42, and is received within an annular groove located near the internal end 36 of the valve block 30. The internal end of the bore 20 containing the damping fluid 82 is sealed by a plug 86 and gasket 87 inserted into the exit section 28 of the bore 20.

An end plug 100 screws into the external end of the threaded section 22 of the bore 20, by means of threads 102 on the internal portion of the plug 100. An annular flange 104 extends outwardly radially at the exterior end of the plug 100 and compresses an O-ring or other gasket 106 between itself and the valve body 12 as the plug 100 is screwed into the threaded section of the bore 22. A threaded hole 108 extends partway through the end plug 100 from its external end, and is adapted to receive a fitting from a high pressure air source (not shown). An air hole 110 extends from the threaded hole 108 through the remainder of the end plug 100.

A coil spring 112 operates within the space between the end plug 100 and the valve block 30, and biases an air seal 114 against the valve block 30 where the valve block bore 42 enters the valve block 30. A tubular insert 115, may be provided around the spring 112, to prevent its coils from catching on the threaded surface of the hole 108.

The air seal 114 comprises a round flat disk having a shallow well 116 on one face, which is in a confronting relationship with the valve block bore 42. The well is filled with an elastomeric material 118 to provide a positive seal between the air seal 114 and the valve block bore 42. A rounded annular flange 120, preferably extends outwardly axially from the valve block 30 where the valve block bore 42 enters, to form a distinct sealing surface 122 for sealing against the elastomeric material 118 in the air seal well 116. The air seal spring 112 biases the air seal 114 against the sealing surface 120 with sufficient spring force to prevent high pressure air from entering the valve block bore 42.

However, if the valve actuator shaft 46 moves outwardly of the valve block bore 42, moving the air seal 114 away from the sealing surface 120, the valve block bore 42 becomes in pressure communication with the high pressure air source. The valve actuator shaft 46 is of substantially lesser diameter than the valve block bore 42 to allow a free flow of air through the valve block bore 42. One or more radial air passages 124 extend outwardly radially from the valve block bore 42 to a reduced external diameter portion 126 of the valve block 30, located between the gaskets 40, which forms an exchange chamber 128 between the valve block 30 and the bore 20. An air passage 130 connects the exchange chamber 128 to the exterior of the valve body 12, (and to the exchange chamber 128 of the intake valve 14) and exits the valve body 12 at a port 131 which may be tapped to receive an air line fitting from the air receiving device (not shown). Thus, when the valve actuator shaft 46 moves outwardly, to disengage the air seal 114, the air passage 130 becomes in pressure communication with the high pressure air source (not shown) connected to the threaded connection 108 on the end plug 100.

The position of the valve actuator shaft 46 is controlled by the control cam 18 acting on a spring cup 132 which is received within the inward most portion of the bore 20 central section 24. The spring cup 132 comprises a tubular body 134 of circular cross section, having an open end 136, and a wall 138 at the opposite end, the wall 138 being in contact, yet not attached to, the inward end of the valve actuator shaft 46. A central axis 137 of the actuator shaft is aligned with a central axis 139 of the spring cup 132, with each axis 137, 139 centrally positioned in the valve bore 20. A helical compression type actuator spring 140 is coaxially received within the tubular body 134, extending from the end wall 138 out of the open end 136, to a wall 142 formed by the transition between the central section 24 and the neck 26 of the bore 20. The actuator spring 140 tends to urge the spring cup 132 away from the wall 142, outwardly of the bore 20. The spring force of the actuator spring 140 is greater than the combined spring forces of the check valve coil spring 80 and the air seal spring 112, and if unrestrained would tend to urge the valve actuator shaft 46 outwardly of the valve block bore 42, opening the air seal 114 and allowing air to flow through the filling valve 14.

The spring cup 132 must be able to operate freely in the valve bore 20. A series of longitudinal bypass grooves 158, of semi-circular cross section, extending the length of the outer surface of the spring cup 132, and a series of bypass holes 160 in the spring cup end wall 138, allow damping fluid 82 to freely flow past the spring cup 132 as it operates in the valve bore 20. Thus, the damping fluid 82 will not significantly impede the movement of the spring cup 132 in the bore 20. Looking more closely at FIGS. 1 through 3, the control cam 18 comprises a generally cylindrical body 144 received through the side of the valve body 12 in a control bore 156. The control bore 156 intersects both valve bores 20, placing portions thereof into fluid communication with one another (see FIG. 1). The control cam 18 comprises an inner end 146 disposed within the control bore 156, and an outer end 148 extending outwardly of the valve body 12.

Figure 4:
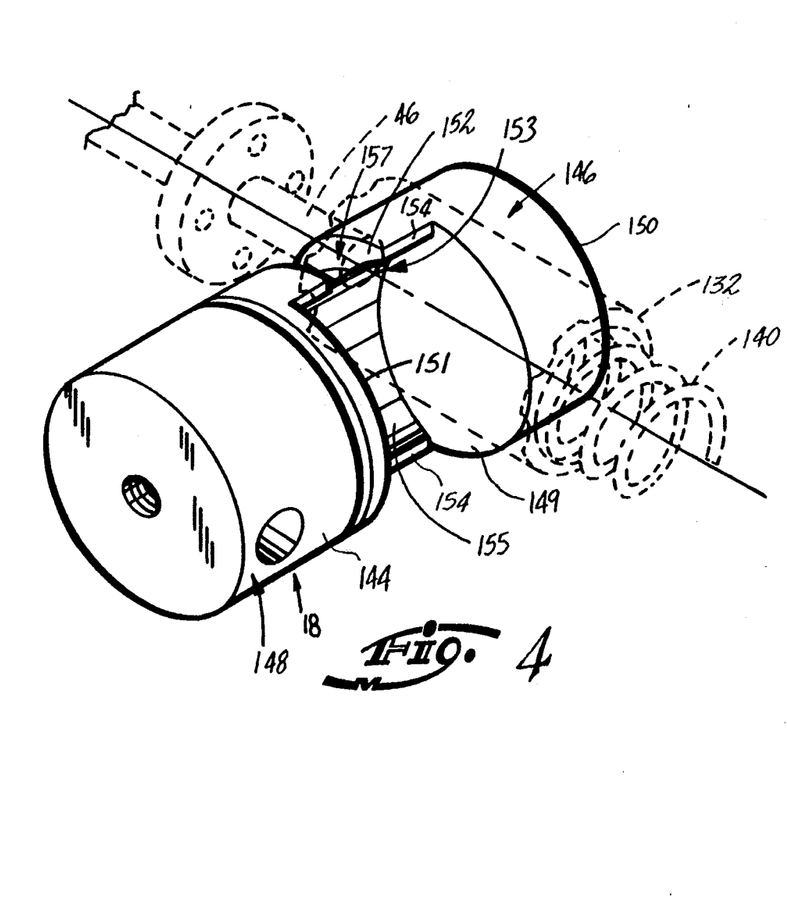
FIG. 4 is a perspective view of a control cam according to the invention for use within the valve assembly of FIG. 1.

Looking now more closely at FIG. 4, a cam lobe 152 is formed in the control cam 18 intermediate the ends 146, 148. The cam lobe 152 is disposed between opposing surfaces 149 and 151, and is defined in part by one or more contact surfaces 154 and a face 155 which slopes away from the contact surfaces 154. The cam lobe 152 is preferably formed by notching a side wall of the cam body 144 as illustrated in FIG. 4. In the preferred embodiment, the surface 155 will have a radius of curvature approximately equal to, or slightly greater than, twice the diameter of the cam body 144. An annular groove 156 is formed in the cam body 152 on the exterior surface of the cam body 144. The annular groove is sized to receive the valve actuator shaft 46.

The cam lobe 152 thus formed is crescent shaped in cross section having two contact surfaces 154 at its points, which may be rounded off or cut flat to form a stronger and smoother contact surface 154. Each contact surface 154 operates against the end wall 138 of one of the spring cups 132. One contact surface 154 acts against the filling valve 14 spring cup 132, and the other contact surface 154 acts against the exhaust valve 16 spring cup 132. The crescent shape ensures that the contact surfaces 154 are well defined, and prevents the surface in between the two contact surfaces 154 from actuating the spring cups 132, thus allowing greater outward travel of the spring cups 132.

Figure 2:
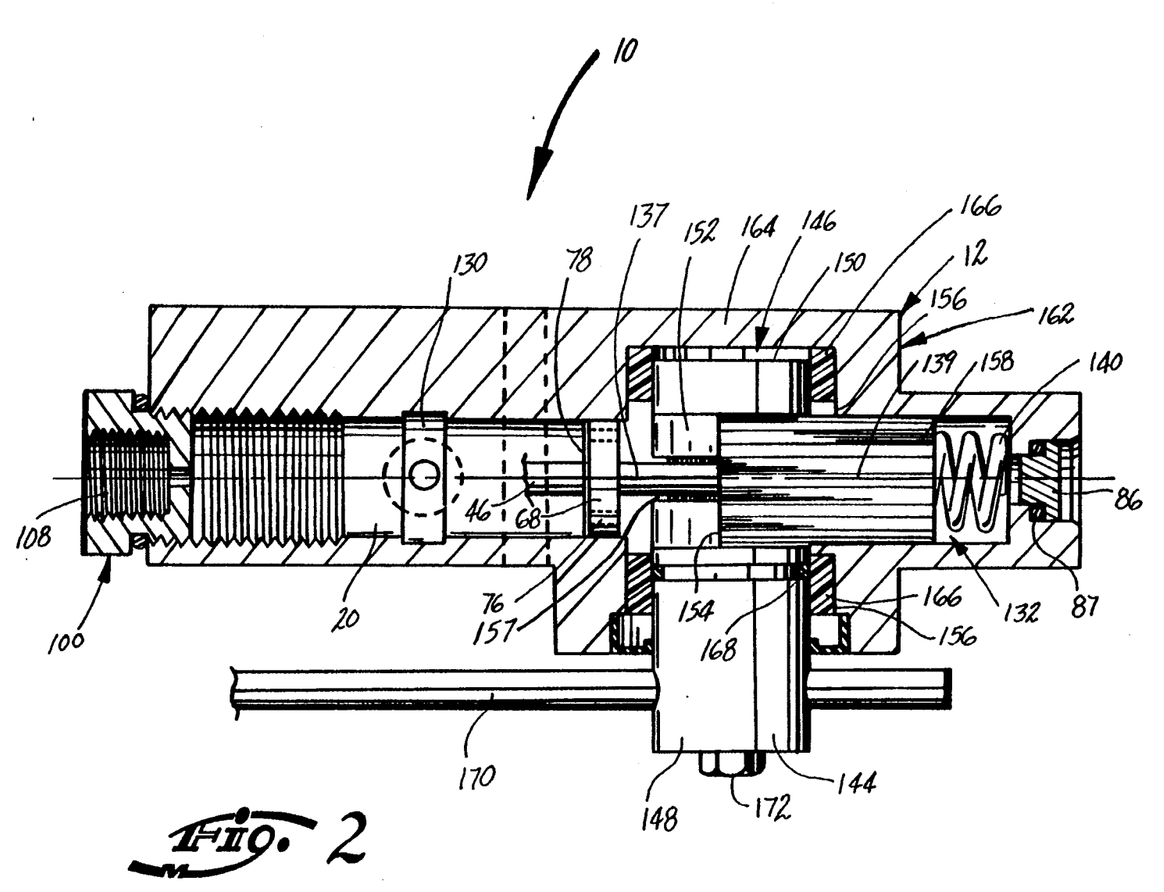
FIG. 2 is a section plan view of the valve assembly of FIG. 1.

Turning also to FIG. 2, the control cam 18 fits into a circular cam cylinder 156 through the side of the valve body 12. The cam cylinder 156 intersects both valve bores 20, placing the portions thereof containing the damping fluid 82 into fluid communication with one another (see FIG. 1), and extends beyond the valve bores 20 without passing completely through the valve body 12. An annular groove 157 in the outside surface of the control cam body 144 at the middle of the portion containing the cam lobe 152, allows the valve actuator shafts 46 to clear the cam lobe (see also FIG. 4). The valve body 12 may be thickened around the cam cylinder 156 by forming annular collars 162 on the valve body 12 where the cam cylinder 156 enters and at the opposite side of the valve body 12 to allow the cam cylinder 156 to be deeper, providing more support for the control cam 18 as it rotates.

A Teflon TM disc thrust bearing 164 at the bottom of the cam cylinder 156 operating against the control cam inner end face 150, and teflon bushing bearings 166 around the control cam body 144 on either side of the cam lobe 152, provide low friction surfaces for the control cam 18 to operate against. A shaft packing 168, in an annular groove about the control cam body 144 external to the valve bores 20 seals the control cam 18 to prevent leakage of damping fluid 82 out of the valve bores 20 through the control cam cylinder 156.

The control cam body 144 extends out of the valve body 12. Any manner of rotational control may be applied to the control cam 18. A preferred system involves a control arm 170 penetrating the control cam body 144 axially and extending horizontally parallel to the valve bores 20. A set screw 172 through the end of the control cam body 144 locks the control arm 170 in place. As external forces cause the control arm 170 to move off horizontal, it rotates the control cam 18.

Figure 5:
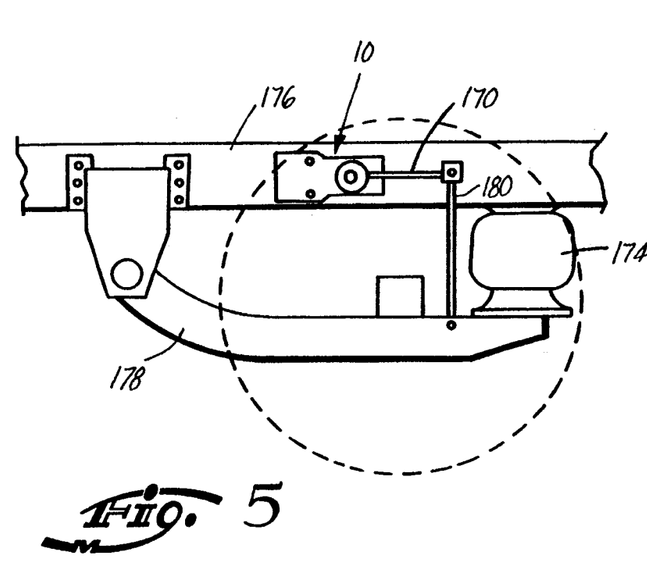
FIG. 5 is a side elevation of a semi-trailer suspension employing the valve assembly of FIG. 1.

Turning to FIG. 5, the height control valve assembly 10 can be used to control the height of a semi-trailer air spring 174, which operates between a truck frame 176, and a trailing arm 178. The valve assembly 10 mounts on the truck frame 176, and the control arm 170 connects to the trailing arm 178 through a linkage 180. The linkage 180 is adjusted so that when the air spring 174 is at the proper height, the control arm 170 is in the neutral or horizontal position. When the air spring 174 height is too low, the trailing arm 178 will be closer to the frame 176, causing the control arm 170 to rise above the horizontal. When the air spring 174 is too high, the control arm 170 will fall below horizontal.

Returning to FIG. 1, the high pressure air supply (not shown) is connected to the threaded port 108 on the intake valve 14, and the air spring (not shown in FIG. 1) is connected to the device port 131 on top of the valve body 12. The port 108 on the exhaust valve 16 is left open to the atmosphere.

When the control arm 170 rises above the horizontal, it rotates the control cam 18 clockwise, causing the lower cam lobe surface 154 to move away from the spring cup 132 on the intake valve 14, allowing the actuator spring 140 to drive the spring cup 132, actuator shaft 46 and thus the intake valve air seal 114 outwardly of the valve bore 20. The intake port 108 is thus in pressure communication with the device port 131, allowing air to flow into the air spring 174 (not shown in FIG. 1). In this state, the spring cup 132 on the exhaust valve 16 is driven inwardly away from the actuator shaft 46, which has no effect upon the exhaust valve 16, which remains closed. If the control arm 170 falls below horizontal, the control cam 18 rotates counter-clockwise, opening the exhaust valve 16, while keeping the intake valve 14 closed.

The design of the height control valve assembly 10 provides a relative degree of stability due to the gap between each actuator shaft 46 and its corresponding air seal 114, in conjunction with the damping from the check valve 52 operating in the damping fluid 82. The check valve 52 prevents the actuator shaft 46 from moving outwardly quickly. Preferably the gap between the check valve disk 68 and the bore 20 is set to so that, under the force of the actuator spring 140, the actuator shaft takes over 5 seconds to travel the distance of the gap between the actuator shaft 46 and the air seal 114 to open the intake valve 14. The exhaust valve 116 is similarly adjusted. The gap between the actuator shaft 46 and the air seal 114 also provides a "dead band", where the control arm 170 can move without actuating either the intake or exhaust valves 14, 16. Thus, when the truck is travelling over rough roads, the height control valve assembly 10 valve will not be overly sensitive, attempting to adjust the air spring 174 for every bump in the road.

The design of the control cam lobe 152 provides for easy assembly of the height control valve 10. The crescent shaped cross section of the control cam lobe 152 occupies less than half of the cross sectional area of the control cam 18. Thus, when the control cam 18 is rotated a full 90 degrees, the control cam lobe 152 moves out of the path of the bore 20. The spring cup 132 and actuator spring 140 can then be inserted into the bore 20, past the control cam 18. The control cam 18 is rotated the opposite direction, compressing the first spring cup 132, to insert the remaining spring cup 132 and actuator spring 140. The remaining parts are then easily assembled. Holes 182 may be provided in the external end 38 of the valve block 30 so that the valve block 30 can be tightened with a spanner wrench (not shown). Mounting holes 184 penetrate the body 12 to allow easy mounting of the valve body 12 to the truck frame 176 or other surface.

Reasonable variation and modification are possible within the scope of the foregoing disclosure and drawings without departing from the spirit of the invention.

The embodiments of the invention in which an exclusive property or privilege is claimed are as follows:

1. A valve assembly for controlling delivery and exhaustion of pressurized air to and from an air spring, said valve assembly comprising:
   a body having a valve bore with an open end, a control bore transverse to and intersecting the valve bore, and a port in communication with the valve bore, said port being adapted to receive an air connection with an air spring;
   an actuator shaft disposed axially in the valve bore for reciprocal movement therein between an actuating position and a resting position, said actuator shaft being biased toward the resting position and having a first end and a second end;
   a control member rotatably mounted within the control bore and operably connected to the actuator shaft first end for movement between a neutral position and an active position, wherein upon rotation of the control member away from the neutral position to the active position, the actuator shaft will be urged toward the actuating position;
   a piston on said actuator shaft intermediate the first and second ends;
   a valve block fixed within the valve bore and having an actuator bore which slidably receives the actuator shaft second end, a seat on one end of the valve block at the actuator bore, and an air passage communicating with the port and the actuator bore;
   a stop member mounted on the actuator shaft in a position wherein the actuator shaft second end will be spaced within the bore inwardly from the seat when the actuator shaft is in the resting position;
   an incompressible fluid within the valve bore between the valve block and the actuator shaft first end;
   a check valve on said piston to enhance the flow of fluid from a first side of the piston to a second side of the piston as the actuator shaft moves away from the actuating position, and to restrict flow of fluid from the second side of the piston to the first side of the piston as the actuator shaft moves toward the actuating position; and
   a valve seal biased against the seat, whereby upon rotation of the control member, the actuator shaft will be urged toward the actuating position, said actuating position being reached only after the second end has engaged the valve seal and urged it away from the seat, thereby establishing communication between the open end and the port.

2. A valve assembly according to claim 1 wherein a cup is disposed within the valve bore internally of the actuator shaft first end and in engagement with the first end, said cup being biased outwardly against the bias of the actuator shaft; and
   the control member has a cam portion engaging the cup, whereby the movement of said cup against the actuator shaft is inhibited by the control member when the actuator shaft is in the resting position and permitted when the control member is rotated.

3. A valve assembly according to claim 2 further comprising longitudinal flutes on the outer surface of the cup, whereby the flutes pass the incompressible fluid so that movement of the cup is relatively unimpeded by the fluid.

4. A valve assembly according to claim 2 wherein a central axis of the actuator shaft aligns with a central axis of the cup.

5. A valve assembly according to claim 2 wherein the control member is a generally cylindrical solid body and the cam portion is at least partially defined by an opening in the body, said cam portion having a contact surface in engagement with the cup, said contact surface being located on a chord of the cross section of the body and said cam further having a surface extending away from the contact surface and the chord.

6. A valve assembly according to claim 2 wherein the control member is a generally solid body and the cam portion is at least partially defined by an opening in the body, the opening being disposed in the body wherein rotation of the control member 90 degrees from the neutral position will allow the cup to pass through the valve bore and the opening unimpeded by the control member.

7. A valve assembly according to claim 2 wherein the cam portion has a groove therethrough which receives the actuator shaft.

8. A valve assembly according to claim 1 wherein the valve block has an internal end and an external end, the seat being disposed on the external end, said valve block further having a stop chamber therein between the internal end and the external end, said stop being disposed on the actuator shaft within the stop chamber.

9. A valve assembly according to claim 1 wherein the second end is spaced from the seat greater than 0.010 inches when the actuator shaft is in the resting position, thereby contributing to a time delay between rotation of the control member and actuation by the actuator shaft.

10. A valve assembly according to claim 1 wherein the piston has at least one aperture extending therethrough, and the check valve comprises a flexible plate disposed on one side of the piston in a position to cover the aperture.

11. In a system for controlling the height of a vehicle, said system comprising a pressurized air source, and air spring, and means to control the flow of air between the pressurized air source and the air spring, the improvement in the control means comprising:
a valve assembly according to claim 1.

12. A valve assembly for controlling delivery and exhaustion of pressurized air to and from an air spring, said valve assembly comprising:
a body having two parallel valve bores, each with an open end, a control bore in said body normal to an imaginary plane containing both valve bores and intersecting the valve bores, an external port in communication with one of the valve bores, said port being adapted to receive an air connection with an air spring, and an air passage extending between and communicating with both valve bores;
each valve bore further having an actuator shaft disposed coaxially therein for reciprocal movement between an actuating position and a resting position, each of said actuator shafts being biased toward the resting position and having a first end and a second end;
a control member rotatably mounted within the control bore and operably connected to each actuator shaft first end wherein rotation of the control member in one direction will urge one actuator shaft to the actuating position and leave the other actuator shaft in the resting position, and rotation of the control member in the opposite direction will urge the other actuator shaft toward the actuating position and leave the one actuator shaft in the resting position;
a piston on each said actuator shaft intermediate the first and second ends;
a valve block fixed within each valve bore and having an actuator bore which slidably receives the respective actuator shaft second end, a seat on one end thereof at the actuator bore, and an air passage communicating between the actuator bore and the port;
a stop member mounted on each actuator shaft in a position wherein the actuator shaft second end will be spaced within the bore inwardly from the seat when the actuator shaft is in the resting position;
an incompressible fluid within each valve bore between the valve block and the actuator shaft first end;
a check valve on each piston to enhance the flow of fluid from a first side of the piston to a second side of the piston as the actuator shaft moves away from the actuating position, and to restrict flow of fluid from the second side of the piston to the first side of the piston as the actuator shaft moves toward the actuating position: and
a valve seal biased against each seat, a first of said valve bore ends being in communication with atmosphere, and a second of said valve bore ends being in communication with a pressurized air source, whereby upon rotation of the control member in one direction, the port will be in communication with atmosphere, and upon rotation of the control member in the opposite direction, the port will be in communication with the pressurized air source.

13. A valve assembly according to claim 12 further comprising a cup disposed within each valve bore internally of the actuator shaft first end and in engagement with the first end, said cup being biased outwardly against the bias of the actuator shaft; and a cam portion on the control member, the cam portion engaging the cup.

14. A valve assembly according to claim 13 wherein the control member is a generally cylindrical solid body and the cam portion is at least partially defined by an opening in the body, said cam portion having a contact surface in engagement with each cup, each of said contact surfaces being located on a chord of the cross section of the body and said cam further having a surface extending away from the contact surfaces and the chord.

15. A valve assembly according to claim 13 wherein the control member is a generally solid body and the cam portion is at least partially defined by an opening in the body, the opening being disposed in the body wherein rotation of the control member 90 degrees from the neutral position will allow one of the cups to pass through its respective valve bore and the opening unimpeded by the control member.

16. A valve assembly according to claim 13 wherein the cam portion has a groove therethrough for receiving the actuator shafts.

17. A valve assembly for controlling delivery and exhaustion of pressurized air to and from an air spring, said valve assembly comprising:
a body having a valve bore with an open end, and a port in communication with the valve bore, said port being adapted to receive an air connection with an air spring;
an actuator shaft disposed coaxially in the valve bore for reciprocal movement therein between an actuating position and a resting position, said actuator shaft being biased toward the resting position and having a first end and a second end;
a valve block fixed within the valve bore and having an internal end and an external end, an actuator bore extending therethrough from the internal end to the external end which slidably receives the actuator shaft second end, and a stop chamber disposed between the external end and the internal end;
a seat on the external end at the actuator bore;
an air passage communicating with the port and the actuator bore; and a stop member mounted on the actuator shaft within the stop chamber, abutment between the stop member and the valve block in the stop chamber spaces the actuator shaft second end within the actuator bore inwardly from the seat when the actuator shaft is in the resting position, whereby movement of the actuator shaft relative to the valve body is limited to the distance the stop moves within the stop chamber.

* * * * *